United States Patent
Ge et al.

(10) Patent No.: US 10,243,485 B2
(45) Date of Patent: Mar. 26, 2019

(54) PEG-STYLE ELECTROSTATIC ROTATING MACHINE EMPLOYING DIELECTRIC SLEEVES

(71) Applicant: Wisconsin Alumni Research Foundation, Madison, WI (US)

(72) Inventors: Baoyun Ge, Madison, WI (US); Daniel Colin Ludois, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 277 days.

(21) Appl. No.: 14/715,214

(22) Filed: May 18, 2015

(65) Prior Publication Data
US 2016/0344306 A1 Nov. 24, 2016

(51) Int. Cl.
*H02N 1/08* (2006.01)
*H02N 1/00* (2006.01)

(52) U.S. Cl.
CPC ............... *H02N 1/08* (2013.01); *H02N 1/00* (2013.01); *H02N 1/002* (2013.01)

(58) Field of Classification Search
CPC .......... H02N 1/00; H02N 1/002; H02N 1/004; H02N 1/006; H02N 1/008; H02N 1/06; H02N 1/08
USPC ........... 310/308–309; 361/296, 298.1, 298.3, 361/298.5, 299.5, 327; 322/2 A
See application file for complete search history.

(56) References Cited

U.S. PATENT DOCUMENTS

| | | | | |
|---|---|---|---|---|
| 2,009,503 | A | * | 7/1935 | Landwerlin .............. H02N 1/08 310/309 |
| 2,947,926 | A | * | 8/1960 | Murch ................... H01B 3/465 218/150 |
| 3,094,653 | A | | 6/1963 | Le May et al. |
| 3,433,981 | A | * | 3/1969 | Bollee .................... H02N 1/004 310/309 |
| 3,436,630 | A | | 4/1969 | Bollee |
| 3,700,983 | A | * | 10/1972 | Goetzl ................ H01G 5/0138 361/279 |

(Continued)

FOREIGN PATENT DOCUMENTS

| | | | |
|---|---|---|---|
| EP | 2040366 A1 | 3/2009 | |
| GB | 0766054 | * 1/1957 | ............... H02N 1/10 |

(Continued)

OTHER PUBLICATIONS

Mognaschi et al. "The Significance of Conductivity and Polarization in Materials for Electrostatic Motors" 9th International Symposium on Electrets (ISE 9) Proceedings 1996 pp. 1050-1054.*

(Continued)

*Primary Examiner* — Burton S Mullins
(74) *Attorney, Agent, or Firm* — Boyle Fredrickson, S.C.

(57) ABSTRACT

An electrostatic rotating electrical machine employs axially extending electrically conductive pegs (for example, on a stator) interacting with the least one of a comparable set of overlapping axially extending pegs on a rotor or a dielectric sleeve which experiences an induced electrostatic charge electrostatically attracted to the stator pegs. A dielectric sleeve may also encase either one or both of the rotor pegs and stator pegs to provide improved electrostatic field shaping and reduced dielectric fluid usage and mechanical susceptibility.

20 Claims, 9 Drawing Sheets

(56) References Cited

U.S. PATENT DOCUMENTS

| | | | | |
|---|---|---|---|---|
| 4,225,801 | A | * | 9/1980 | Parker, Jr. .............. H02N 1/004 310/308 |
| 4,953,057 | A | * | 8/1990 | Davidian ................. H01G 5/06 29/25.42 |
| 6,101,084 | A | * | 8/2000 | Rakov .................. G01D 5/2412 361/277 |
| 6,353,276 | B1 | * | 3/2002 | Gendron ................ H02N 1/004 310/309 |
| 6,483,223 | B2 | * | 11/2002 | Samper ................... H02N 1/00 310/309 |
| 6,690,568 | B2 | * | 2/2004 | Johnson ............... H01G 5/0132 361/272 |
| 8,278,797 | B2 | * | 10/2012 | Sashida ................. H02N 1/004 310/309 |
| 8,643,249 | B2 | | 2/2014 | Post |
| 2013/0106317 | A1 | * | 5/2013 | Ludois ..................... H02N 1/00 318/116 |
| 2014/0175941 | A1 | * | 6/2014 | Johnson ................ H02N 1/006 310/309 |
| 2014/0232235 | A1 | * | 8/2014 | Boughtwood ......... H01R 39/30 310/219 |
| 2014/0252914 | A1 | | 9/2014 | Post |
| 2014/0265722 | A1 | | 9/2014 | Post |
| 2016/0099663 | A1 | | 4/2016 | Petrowsky et al. |

FOREIGN PATENT DOCUMENTS

| | | | | |
|---|---|---|---|---|
| GB | 0766055 | * | 1/1957 | .............. H02N 1/08 |
| JP | 08066058 | A | 3/1996 | |
| JP | 11178360 | A | 7/1999 | |
| KR | 1020020050318 | A | 6/2002 | |

OTHER PUBLICATIONS

Mognaschi et al "A dielectric induction motor employing a rotating electric field" Conference Record of the 1991 IEEE Industry Applications Society Annual Meeting, 1991 pp. 562-564, vol. 1.*

Mognaschi et al "Asynchronous dielectric induction motor" IEEE Proceedings, vol. 127, Pt.A No. 6, Nov. 1990, pp. 331-338.*

Choi et al. "A Surface Charge Induction Motor", IEEE Proceedings, vol. 59, No. 5, May 1971, pp. 737-748.*

"New kind of motor using dielectric fluid", Electronics & Power, Apr. 1968, p. 173.*

D. Albert et al.; Initiation of Electrical Breakdown in Ultrahigh Vacuum; J. Vac. Sci. Technol., vol. 1, No. 2, Nov. 1964; pp. 35-50; University of Illinois, US.

Baoyun Ge et al.; Evaluation of Dielectric Fluids for Macro-Scale Electrostatic Actuators and Machinery; Entire Document; Sep. 2014 IEEE Energy Conversion Congress and Exposition (ECCE), Madison, Wisconsin.

Steven F. Nagle et al.; "An electric induction micromotor." Microelectromechanical Systems, Journal of 14, No. 5 : pp. 1127-1143; Oct. 2005; US.

International Search Report of Application No. PCT/US2016/032665; Filing Date: May 16, 2016.

* cited by examiner

PEG-STYLE ELECTROSTATIC ROTATING MACHINE EMPLOYING DIELECTRIC SLEEVES

STATEMENT REGARDING FEDERALLY SPONSORED RESEARCH OR DEVELOPMENT

This invention was made with government support under 1452230 awarded by the National Science Foundation. The government has certain rights in the invention.

CROSS REFERENCE TO RELATED APPLICATION

BACKGROUND OF THE INVENTION

The present invention relates to rotating electrical machines (e.g., electrical motors and generators) and in particular to a rotating electrical machine employing axially extending pegs.

Electrical motors and generators share similar structures of an electrically interacting stator and rotor and may be collectively termed "rotating electrical machines." Conventional rotating electrical machines may be roughly divided into "electromagnetic" devices exploiting magnetic fields between moving parts, and "electrostatic" devices exploiting electrical fields between moving parts.

Electrostatic rotating electrical machines have a number of advantages over conventional electromagnetic rotating electrical machines including the elimination of magnets and costly rare earth materials, significant weight from ferrous materials, and high current copper windings. Electrostatic machines may be made of lower weight/cost dielectric materials and conductors.

Electrostatic machines are commonly found in microscale, micro-electromechanical systems (MEMS) which permit extremely small, gaps between rotor and stator elements allowing high capacitance between surfaces and high electrical fields. For larger scale rotating machines, for example, those providing integer horsepower and larger outputs (macro-scale), the physical gap between the stator and rotor may be one to three orders of magnitude larger than that for MEMS machines. This larger gap requires higher applied voltages typically in the thousands or even tens of thousands of volts for comparable shear stress (electric field strength) in the rotor/stator gap to attain useful amounts of torque. These high voltages normally require ultrahigh vacuum containment vessels to prevent arcing between stator and rotor components. The simultaneous requirement of minimizing the gap (tolerances) between stator and rotor components and using high voltage driving power, in macro-scale rotating machines, can present significant manufacturing challenges in manufacturing macro-scale electrostatic motors.

U.S. patent application Ser. No. 14/598,411, assigned to the assignee of the present invention and hereby incorporated by reference, describes an electrostatic rotating machine that simplifies manufacture by eliminating plates in favor of interdigitated pegs immersed in a high dielectric strength, high relative permittivity fluid. The peg-style construction allows increased design flexibility through modification of peg spacing alignment and dimensions, allowing variations in capacitance as a function of rotation to be maximized and closely matched with available driving voltages/currents for improved torque and torque consistency. Torque is generated in the reference patent by means of variable capacitance. As the shaft of the machine turns, the capacitance among the rotor and stator pegs varies, Applying voltage to specific pins sets will produce torque proportional to the derivative of the capacitance with respect to position. This torque mechanism is the dual to electromagnetic reluctance based machines.

SUMMARY OF THE INVENTION

The present invention provides an improvement in the above-referenced peg-style electrostatic machine which uses dielectric sleeves that may fit around and/or in between rows of pegs.

In the former case, the sleeves may be of a low permittivity material and may be used to shape the electrostatic field between the pegs of the rotor and/or stator to provide improved torque characteristics and tailoring of leakage flux or mechanical or drag properties. In the latter case, the sleeves may provide for a high permittivity material (for example, positioned on the rotor) which generates torque by electrostatic induction.

Specifically then, in one embodiment, the invention provides an electrostatic machine having at least one stator element providing a plurality of axially extending conductive stator pegs and at least one rotor element rotatable with respect to the stator element and providing an axially extending tubular sleeve of dielectric material positioned circumferentially about the axis radially adjacent to the conductive stator pegs with rotation of the rotor.

It is thus a feature of at least one embodiment of the invention to provide a rotor structure offering reduced fluid turbulence and reduced dielectric fluid volume when a dielectric fluid is used.

The tubular dielectric material may have a low relative permittivity less than that of the dielectric fluid, for example, less than 5 and encase a set of axially extending conductive rotor pegs.

It is thus a feature of at least one embodiment of the invention to provide a shaping of the electrostatic field between rotor pegs and stator pegs that improves the torque profile when the electrostatic machine is used as a motor or generator and/or to provide improved peg support and reduced drag.

The electrostatic machine may further include second axially extending tubular sleeve of dielectric material encasing the plurality of axially extending conductive stator pegs, the second axially extending tubular sleeve constructed of dielectric material having a relative permittivity of less than five It is thus a feature of at least one embodiment of the invention to provide electrostatic field shaping at both the rotor and stator pegs for the purpose of lowering stator leakage flux.

Alternatively, the axially extending tubular sleeve has a relative permittivity greater than three or greater than any intervening dielectric fluid It is thus a feature of at least one embodiment of the invention to provide a sleeve which may support an induced internal electrical field (for example, induced dipole moments on the rotor following a stator potential wave) so that the electrostatic machine may operate in a manner analogous to a magnetic induction motor, with the stator field inducing charge on the rotor and generating torque when there is rotational slip between them, i.e. when the stator flux wave and rotor have non-zero relative velocity.

It is thus a feature of at least one embodiment of the invention to provide an electrostatic machine that produces torque primarily from induction mechanisms and rotor-stator slip. In this configuration the rotor consists of concentric conducting sleeves coated with a dielectric material matched to desired amount of slip. Dielectrics with lower resistivity may provide higher nominal values or slip while higher resistivity matches lower values of slip.

The second axially extending tubular sleeve may provide a high dielectric material coated on a supporting tube of a different material.

It is thus a feature of at least one embodiment of the invention to permit a mechanically robust sleeve to be constructed by blending materials with high relative permittivity and high strength and/or conducting characteristics.

The different material may be a metal.

It is thus a feature of at least one embodiment of the invention to provide a high-strength sleeve support structure that can be readily machined or otherwise fabricated.

The electrostatic machine may further include a second axially extending tubular sleeve of dielectric material encasing the plurality of axially extending conductive stator pegs, the second axially extending tubular sleeve of dielectric material having a relative permittivity of less than a dielectric of the second axially extending tubular sleeve.

It is thus a feature of at least one embodiment of the invention to permit field shaping, mechanical strength, and/or reduction of Niscous drag in an induction-type electrostatic motor.

The electrostatic machine may further include a power source providing three-phase substantially sinusoidal electrical power to the stator pegs so that every third stator peg at a given radius from the axis has the same phase and every peg has a different phase from its circumferential neighbors.

It is thus a feature of at least one embodiment of the invention to provide an electrostatic motor that can operate without the need for complex solid-state power conversion circuits. Three-phase electrical power is readily available in a variety of environments.

The high dielectric fluid may provide a relative permittivity of greater than five.

It is thus a feature of at least one embodiment of the invention to allow relaxed tolerances in the separation between stator and rotor elements necessary for practical manufacture of macro-scale machines. The high relative permittivity provides increased capacitance between rotor and stator elements offsetting the effects of greater separation and lower field, strength for a given voltage between these elements.

The stator pegs may include a first and second set of stator pegs arranged in rows of concentric circles wherein the pegs of the first set of stator pegs is offset angularly along different lines of radius with respect to the pegs of the second sets of stator pegs It is thus a feature of at least one embodiment of the invention to provide a compact design that provides torque smoothing and reduced cogging through stator pegs that are offset in angle.

The pegs may have a substantially constant cross-sectional diameter measured in a plane perpendicular to the axis.

It is thus a feature of at least one embodiment of the invention to provide an electrostatic machine with a capacitance profile (change in capacitance as a function rotor angle) that reduces angular ranges of constant capacitance that result in torque dropout when compared to flat or strip-shaped pegs.

The electrostatic machine may include multiple concentric axially extending tubular sleeves attached to the rotor and flanked by multiple sets of stator pegs in concentric circles about the axis.

It is thus a feature of at least one embodiment of the invention to permit a ganged construction work arbitrary increase of torque or power.

Alternatively or in addition, the electrostatic machine may include at least two stator elements fixed with respect to the housing, each stator element providing a plurality of axially extending conductive stator pegs extending in opposite directions wherein the pegs of the at least two stator elements include a first and second set of pegs arranged in rows of equal radius concentric circles wherein the pegs of the first set of pegs are offset angularly along different lines of radius with respect to the pegs of the second sets of pegs.

It is thus a feature of at least one embodiment of the invention to provide an electrostatic machine with a capacitance profile (capacitance as a function rotor angle) that reduces the small signal variation of capacitance riding on a large signal capacitance waveform. The large signal may be mostly triangular, trapezoidal, sinusoidal, (for variable capacitance torque) or a constant value (induction torque). Higher spatial frequency capacitance harmonics that occur due to the discrete nature of the pegs may be minimized or cancelled by angularly skewing the two stator halves that enclose the rotor slightly from one another.

It is thus a feature of at least one embodiment of the invention to provide a macro-scale electrostatic machine with large power outputs.

These particular objects and advantages may apply to only some embodiments falling within the claims and thus do not define the scope of the invention.

DETAILED DESCRIPTION OF THE PREFERRED EMBODIMENT

The invention may be configured to utilize one of two torque producing mechanisms.

The first torque mechanism is caused by variable capacitance between stator and rotor pegs, much as in the reference patent. Here the sleeve may be of a low permittivity material and may be used to shape the electrostatic field between the pegs of the rotor and stator for improved torque characteristics and tailoring of leakage flux. Leakage flux refers to the electric field that couples between the stator pegs or rotor pegs, but is not mutually corrillion between the stator and rotor. Generally it is the purpose of the sleeve to lower leakage flux between stator pegs, or between the rotor pegs, as leakage flux does not contribute to the production of torque. The sleeve may also help tailor the variability of the mutual capacitance between rotor and stator pegs with respect to position.

The second torque mechanism is electrostatic induction. Here, the sleeves may provide for a low or high permittivity material which manages leakage flux or enhances capacitive coupling between the stator and rotor with the objective of greater induced charge from the voltages on nearby stator pegs. Induced charge results from voltage applied to the stator pegs, usually balanced three-phase voltages, to create a traveling potential wave in the gap between the stator and rotor. The potential wave induces charge on the rotor. The induced rotor charge lags the stator potential wave, or "slips," thus there is a tangential component to the field between the stator and rotor. The tangential field drags the rotor in an effort to catch it up to stator potential wave, causing torque in a manner roughly analogous to an electromagnetic induction motor. For this torque mechanism, the capacitance between the stator and rotor does not change with position and is more constant. Therefore, the number of pegs on the rotor may approach an infinite number, until a continuous metal surface (sleeve) is formed. The surface is then coated with material that is generally considered a dielectric with finite relative permittivity and resistivity. The product of permittivity and resistivity of a material may be selected to correspond to a particular operating slip, i.e. the normalized difference in rotor and stator rotational speeds.

I. Exposed Peg Design

Figure 1:
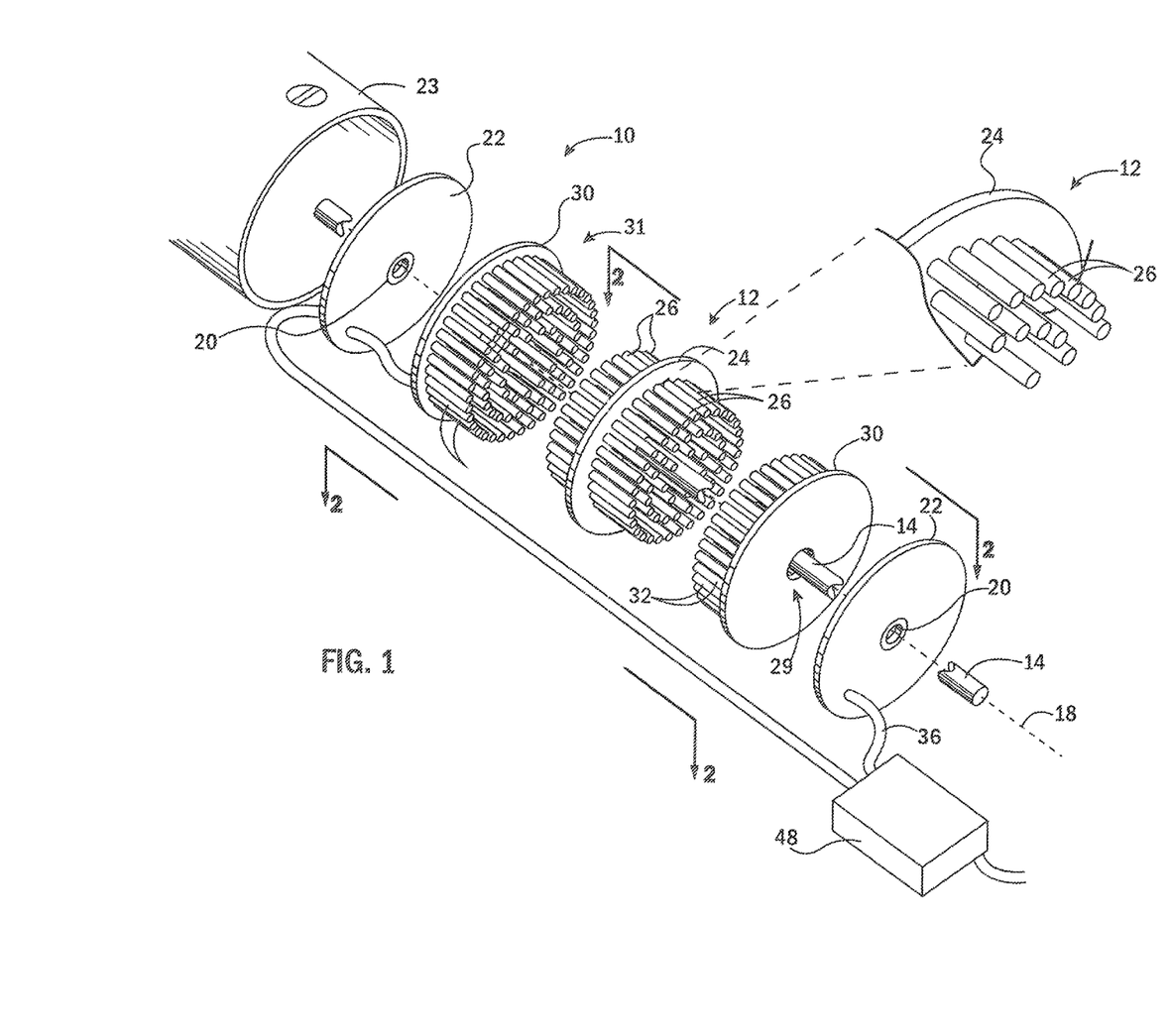
FIG. 1 is an exploded perspective view of one embodiment of the present invention providing overlapping axial pegs extending from rotor and stator elements.

Referring now to FIG. 1, a rotating electrical machine 10 per the present invention may provide a rotor 12 mounted on an axle 14 for rotation about an axis 18. The axle 14 may be supported at opposite ends by bearings 20 in turn held on end plates 22. The axle 14 may pass through one end plate 22 to be attached to other rotating machinery, for example, to provide for a drive torque to that machinery in the manner of a conventional motor or to receive a driving force when the machine 10 is used as a generator.

Figure 2:
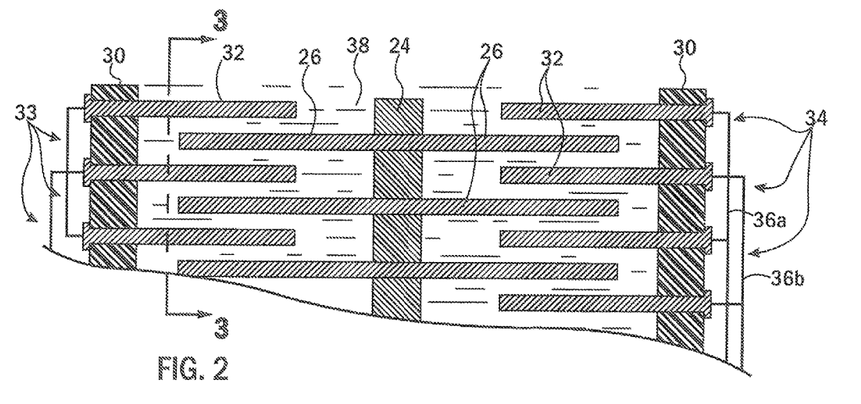
FIG. 2 is a cross-section taken along line 2-2 of FIG. 1 in an unexploded configuration showing overlap of the rotor and stator pegs as immersed in a high dielectric fluid.

Referring also to FIG. 2, rotor 12 may comprise one or more rotor disks 24 extending generally perpendicularly to the axis 18 to rotate with the axle 14. A set of concentrically arranged rotor pegs 26 in constant radius rows 33 may extend from the front and rear surfaces of the rotor disks 24 parallel to the axis 18. Each of the rotor pegs 26 is electrically conducting and may be either insulated from other rotor pegs 26 by insulating rotor disks 24 or electrically joined by a conductive rotor disk 24. In one embodiment the rotor pegs 26 are circular cylinders capped with hemispherical distal ends; however, generally any shape of substantially constant axial cross-section is contemplated and other peg cross-sections may also be used, for example, those offering decreased flow resistance through a fluid.

Flanking each rotor disk 24 along the axis 18 are two stator disks 30 of stators 31 also having axial stator pegs 32 extending inward toward a respective rotor disk 24 of the rotor 12. The stator disks 30 are generally stationary with respect to the housing 23 and may have a central bore 29 allowing free passage of the axle 14 through the stator disks 30 to the bearings 20.

The stator pegs 32 are also arranged circumferentially along constant radius rows 34 fitting between the rows 33 of rotor pegs 26 so that the rotor 12 may rotate without interference between the rotor pegs 26 and stator pegs 32. The stator pegs 32 are also electrically conductive but selectively isolated from each other by an insulating material of the stator disk 30. In a first embodiment, alternate concentric rows 34 of stator pegs 32 are joined to either a first conductor 36a or second conductor 36b as will be described below.

Each rotor disk 24 and the two stator disks 30 form a three-disk element that may be repeated along the axle 14 with the rotor pegs 26 and/or stator pegs 32 and interconnected for parallel or series operation.

The end plates 22 may form part of a housing 23 that together provide an enclosed volume holding the rotor 12 and stator 31 and within which the rotor 12 may rotate. The housing 23 may be filled with a dielectric fluid 38 surrounding the rotor pegs 26 and stator pegs 32 to provide insulation therebetween, preventing arcing or other current flow and increasing the dielectric constant in the gaps between the rotor pegs 26 and stator pees 32. In one embodiment, the dielectric fluid 38 may be Verterel® XE, a hydrocarbon fluid ($C_5H_2F_{10}$) having a dielectric constant from 7-10, a breakdown strength of 14,000 to 28,000 volts/mm, a volume resistivity (ohm-cm) of $10^9$-$10^{11}$ and a viscosity (cPs) of 0.67. Generally the present invention contemplates a breakdown strength of at least 5000 volts per millimeter and desirably greater than 10,000 volts per millimeter and the dielectric constant of at least five and desirably greater than seven and a viscosity of less than water and desirably less than 70 cPs.

Figure 3:
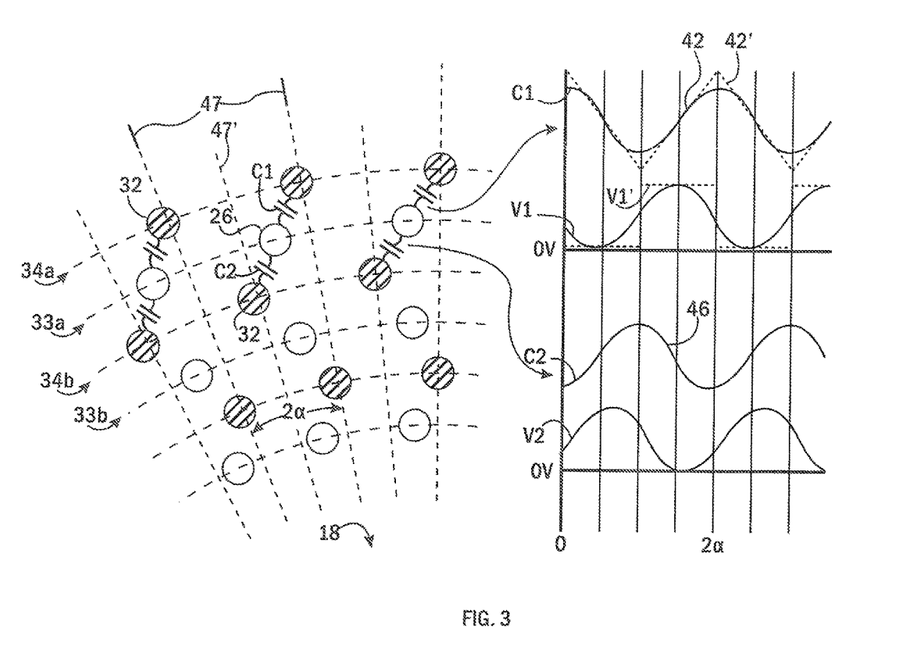
FIG. 3 is a cross-section taken along line 3-3 of FIG. 2 showing overlap of the rotor and stator pegs together with a plot of a capacitance profile showing mutual capacitance between the two with rotation of the rotor and two possible driving voltages in solid and dotted lines.

Referring now to FIG. 3, in this embodiment, the stator pegs 32 in each stator row 34, at a given constant radius with respect to the axis 18, may be aligned along radial lines 47 at equal angular spacing of 2α. Every other stator row 34 of stator pegs 32, as one moves radially, may be offset in angle from the previous row by α. As noted before, every other stator row 34 connects to a different conductor 36a or 36b. The rotor pegs 26 may also be spaced in rows 33 of constant radius about axis 18 positioned approximately halfway between the rows 34. The rotor pegs 26 may also have an equal angular spacing of 2α and are aligned along rotor lines 47'.

Generally, as a given rotor peg 26' moves in rotation past a first stator row 34a of stator pegs 32, the given rotor peg 26' experiences a mutual capacitance with proximate stator pegs 32 such that the total mutual capacitance between all rotor pegs 26 of a given rotor row 34 and the adjacent stator pegs 32 of stator row 34a (and electrically connected stator rows 34) provide a value C1 that changes with rotational angle. This change in C1 will be termed a capacitive profile and is shown by plotted waveform 42. With the described angular spacing of rotor pegs 26 and stator pegs 32, the periodicity of waveform 42 will be 2α with peak values of capacitance C1 when rotor pegs 26 are aligned radially with stator pegs 32. The torque caused by electrostatic attraction between rotor pegs 26 and stator pegs 32 of stator row 34 will be a function of a product of the rate of change of the capacitance C1 and the square of the applied voltage to stator pegs 32. Accordingly, a voltage waveform V1 applied to stator pegs 32 will desirably have a nonzero magnitude (including a peak value) during the positive slope of C1 and a low or zero magnitude during the negative slope of C1 (where the resultant torque would be negative and hence counterproductive). A highest average torque is obtained when the highest values in the driving voltage are aligned with the highest positive derivative of C1.

When waveform 42 of C1 is approximately sinusoidal and a sinusoidal driving power is used, maximum average torque is provided using a sinusoidal voltage V1 with the phase lag of 90 degrees (α/2) with respect to waveform 42.

Insofar as sinusoidal voltages/currents may be readily obtained for motor driving, a sinusoidal capacitive profile of waveform 42 may be desirably promoted. This capacitive profile is encouraged by matching compact rotor pegs 26 and stator pegs 32 as opposed to having one set of pegs extend at substantial width along the circumferential direction such as would tend to promote a trapezoidal waveform 42 providing sections of constant capacitance C1 such as would promote zero torque.

Similarly, if capacitance profile waveform 42 were triangular, as indicated by waveform 42', a square wave voltage signal V1' would provide the highest average torque. Such a square wave can be produced by solid-state switching devices gating a DC voltage/current source.

Note that in both cases the alternating waveform of voltage of V1 or V1' is given a DC offset, i.e. it is a DC value with AC component riding on it. The DC voltage provides a nonzero electrical field, and induces electrostatic charge separation in the floating rotor pegs 26. In another embodiment to be discussed below where direct electrical connection may be had by the rotor pegs 26, this induced field is not required. The magnitude of the voltage may be reduced to zero by the AC component at certain points when negative torque would otherwise be generated.

Referring still to FIG. 3, the present invention provides a second stator row 34b of stator pegs 32 staggered with respect to the first stator row 34a of stator pegs 32 on the rotor disk 24 and positioned to generate a peak torque when the torque produced by stator pegs 32 of first stator row 34a is lowest thus also providing improved torque consistency. In this case, a waveform 46 of capacitance C2 provides a 180-degree phase relationship with respect to the waveform 42 of capacitance C1, and similarly a voltage V2 with a 180 degrees phase relationship with respect to voltage V1 may be advantageously applied to conductor 36b and stator pegs 32 of stator row 34b.

Figure 7:
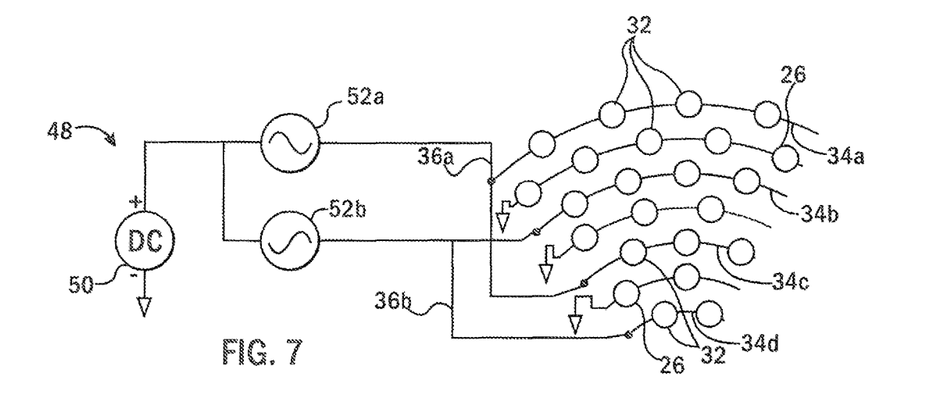
FIG. 7 is a simplified schematic of a power supply for the embodiment of FIG. 3.

Referring momentarily to FIG. 7, a power source 48 producing the desired waveforms may employ a DC power supply 50 placed in series with two AC power supplies 52a and 52b, each of these latter AC power supplies 52a and 52b producing identical sinusoidal (square wave) output voltages with 180-degree respective phase difference. These AC power supplies 52a and 52b may be easily implemented by using two independent secondary windings of transformers having a common primary AC input and wiring the two secondaries with opposite polarity.

The AC power supplies 52a and 52b may connect with conductors 36a and 36b, respectively. The return or ground side of DC power supply 50 may he held at the same potential as the rotor pegs 26, for example, by a brush connection or the like.

Figure 4:
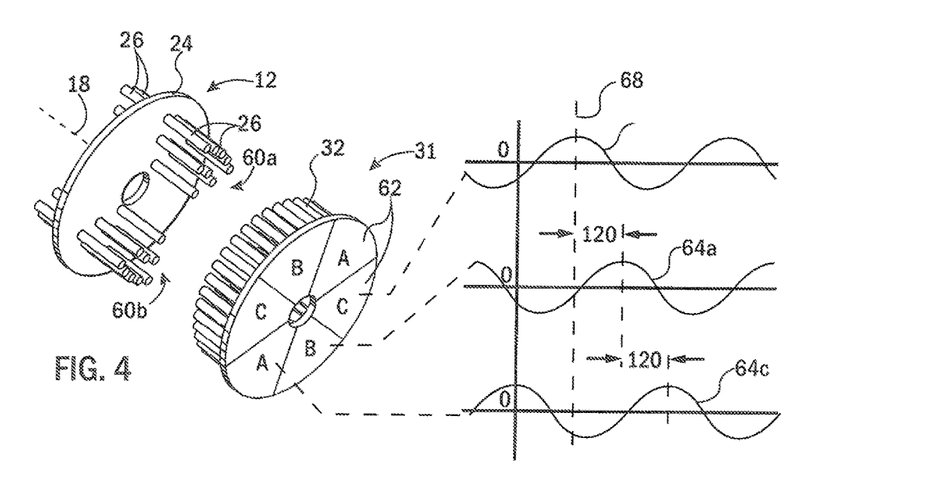
FIG. 4 is a figure similar to that of FIG. 1 showing a rotor and one stator in isolation in a three-phase embodiment with isolated clusters of rotor pegs, also showing a three-phase driving voltage.
Figure 5:
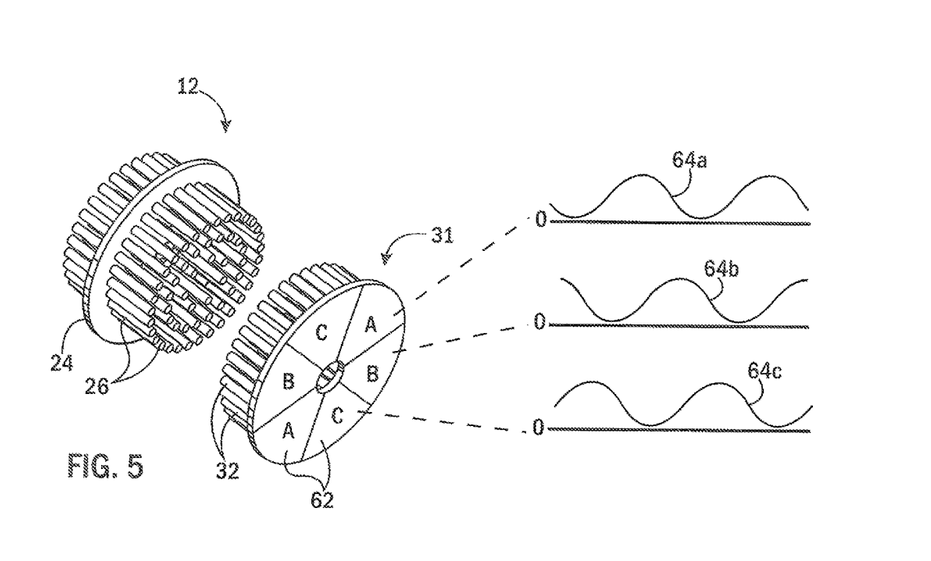
FIG. 5 is a figure similar to that of FIG. 4 showing a three-phase embodiment with a continuous angular range of rotor pegs.

Referring now to FIG. 4, in an alternative embodiment, the rotor pegs 26 of the rotor 12 may he collected into isolated clusters, for example, angularly opposed rotor clusters 60a and 60b each spanning in this depiction approximately 60 degrees of angular range about axis 18. In contrast, the stator pegs 32 may still provide a full angular range of 360 degrees about axis 18 but in this case are electrically connected together to form similar sized stator clusters 62, the stator pegs 32 of each stator cluster 62 communicating with each other but isolated from adjacent stator clusters. So, for example, six stator clusters 62 may be developed each having an angular range of 60 degrees and distributed in sequence about the axis 18. Stator clusters 62 in opposition may be electrically connected together to provide three electrically independent stator clusters 62 labeled A, B, and C.

Each of these stator clusters 62 of A, B, and C may be provided with a different voltage waveform 64a-64c being, for example, different phases of three-phase electrical power providing sinusoidal voltages having a 120 degrees phase difference with the other phases. It will be understood that this connection creates a rotating electrical vector about axis 18 that will apply a corresponding rotational torque to the rotor clusters 60a and 60b. In effect, as the rotor spins, a rotating capacitance wave is also created such that the capacitance rises and falls among the phases. The capacitance and voltage waves must be synchronized. The angle between the rotating waves controls the power/torque output, much as in rotating electromagnetic machinery.

It will be appreciated that the stator clusters 62 need not extend a full 60 degrees as shown but, instead, may extend by as much as 120 degrees for a single stator cluster 62 with a corresponding increase in the size of rotor clusters 60 or conversely may be broken into multiple smaller stator cluster sizes, for example, of 30 degrees, 10 degrees, or even to individual stator radial lines 47. In all cases the stator clusters 62 alternate A, B, C electrical connections. A larger number of stator clusters 62 and rotor clusters 60 will produce a slower motor speed and more uniform motor torque for a given frequency of waveforms 64. As before, the size and numbers of the stator clusters 62 and rotor clusters 60 are matched to accomplish desired operating characteristics. More generally, the angular range of the rotor cluster 60 may be larger than the angular range of the stator cluster 62, for example, being 90 degrees for the rotor cluster 60 and 60 degrees for the stator clusters 62. This allows for a transition from one phase to another that provides an improved capacitance profile.

Figure 6:
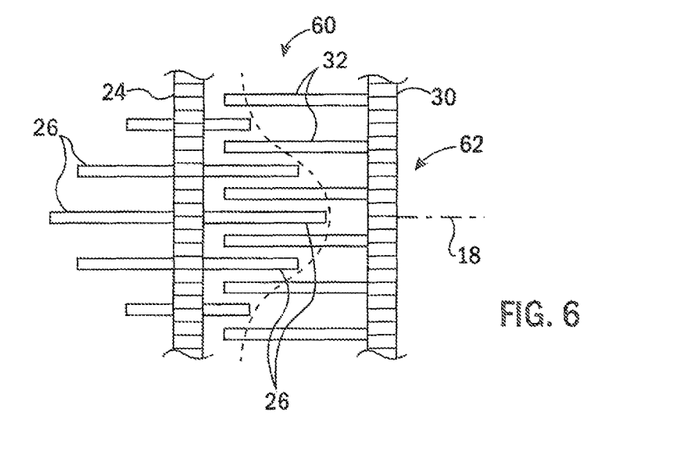
FIG. 6 is a top fragmentary view of overlapping rotor pegs and stator pegs of FIG. 4 showing variation in length of rotor pegs for tailoring the capacitive profile.

Referring now to FIG. 6, the rotor pegs 26 of each rotor cluster 60 may he given different axial lengths to modify the capacitive profile exhibited as the cluster 60 moves through the stator pegs 32 of a given cluster 62. This modification of the rotor pegs 26 may be done to better match the capacitive profile to the driving waveform, for example, to make it more sinusoidal or more triangular. Alternatively, or in addition, the same modification could be done with the stator pegs 26.

Figure 10:
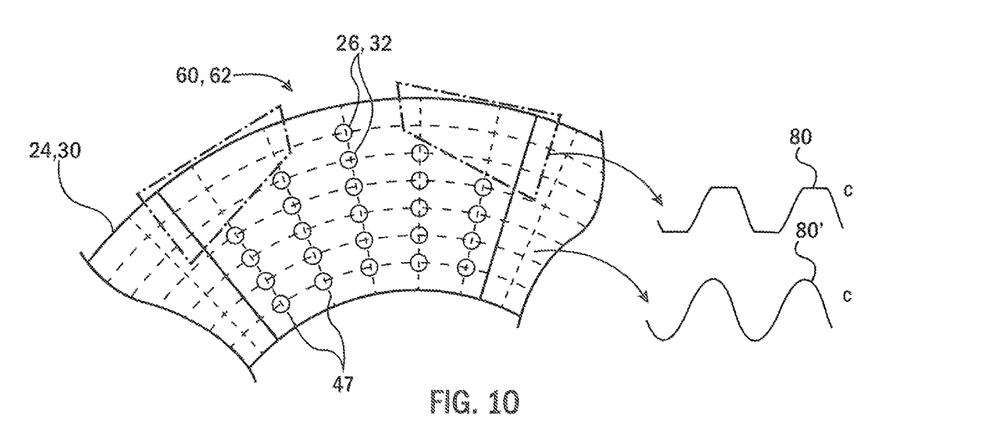
FIG. 10 is a fragmentary elevational view of pegs extending from one of the rotor or stator showing a depopulation of some pegs to provide improved capacitive profile.

Referring now to FIG. 10, the pegs 26 or 32 of either the rotor 12 or stator 31 may further have their length essentially reduced to zero to modify the capacitive profile exhibited between clusters 60 or 62 as they pass each other, In this ease, pegs 26 or 32 at the peripheral outer edges of radial lines 47 at the leading and trailing side of the clusters 60 and 62 are progressively remove removed as one moves away from a center of the cluster to smooth a trapezoidal capacitive profile waveform 80 between clusters 60 and 62 to a more sinusoidal capacitive waveform 80. This technique which emphasizes not only length but location may be combined with a nonzero varying lengths of pegs 26 or 32

Figure 8:
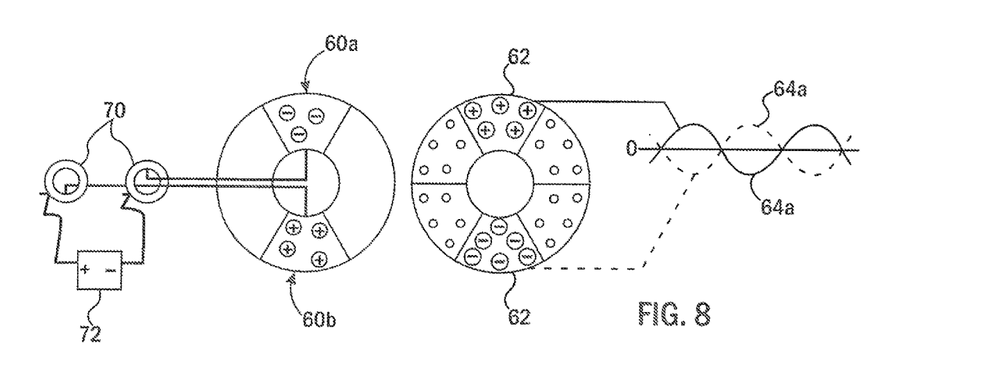
FIG. 8 is a simplified representation of slip rings providing electrical voltage to the rotor of FIG. 4 for improved torque through charge injection.

Although the rotor pegs 26 of the rotor clusters 60 may be electrically floating On an insulating rotor disk 24, in one embodiment slip rings 70 may be provided so that a DC bias from a DC power source 72 may be applied across, for example, opposite rotor clusters 60a and 60b providing them with a net charge that will be attracted to opposite charges applied to the stator clusters 62, in this case the opposite stator clusters 62 may also be given different polarities, for example, by providing waveform 64a to a first stator cluster 62 and having waveform 64a be 180 degrees out of phase with waveform 64a to an opposite stator cluster 62. This ability to provide for repulsive as well as attractive forces between rotor pegs 26 arid stator pegs 32 raises the possibility of bipolar operation with appropriate phasing of the clusters 62.

Figure 9:
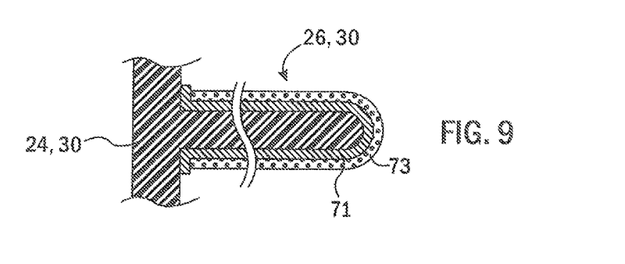
FIG. 9 is a fragmentary cross-section of one rotor or stator peg taken along an axial plane showing use of a conductive coating on an insulating material.

Referring now to FIG. 9, each of the rotor pegs 26 and stator pegs 32 need not be fully conductive but only require an outer conductive surface that can support the necessary electrical charge. Accordingly, the rotor pegs 26 and stator pegs 32 may be, for example, constructed of injection-molded thermoplastic being electrically insulating and having a high electrical breakdown. This insulating core may be coated with a conductive layer 71, for example, by sputtering or electroplating with a conductive metal such as copper, aluminum, or nickel. The conductive layer 71 may be in turn coated with an insulating material 73 which may also provide a high dielectric constant. Examples of such include titanium dioxide (TiO$_2$) having a dielectric, constant (relative permittivity) $\varepsilon_r$ of greater than 80 or barium titanate (BaTiO$_3$) having a dielectric constant $\varepsilon_r$ of greater than 1500. Electrode materials may also be incorporated into the rotor pegs 26 and stator pegs 32.

The dielectric fluid 38 may include ferroelectric particles for enhanced permittivity.

II. Encased Peg Designs

A. Flux Shaping Sleeves

Figure 11:
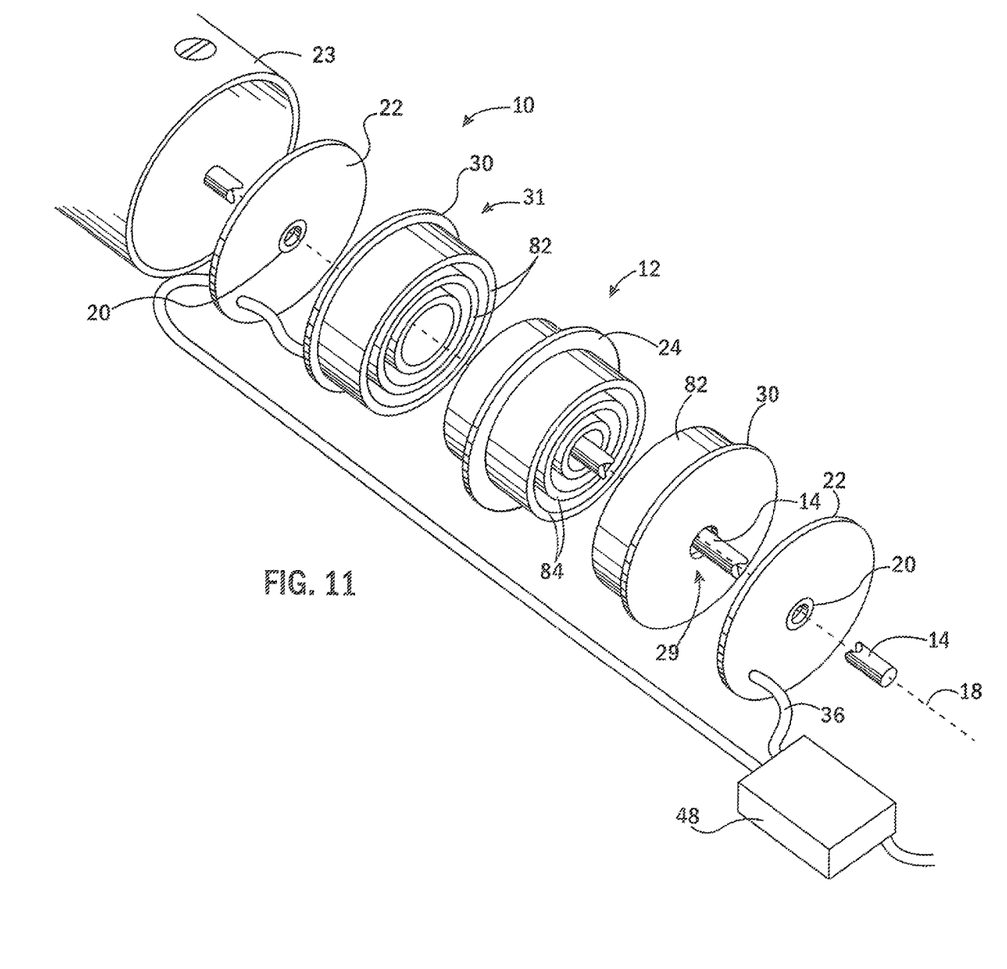
FIG. 11 is a figure similar to that of FIG. 1 showing an alternative embodiment in which the rotor and stator pegs are encased in low relative permittivity sleeves.

Referring to now to FIGS. 1 and 11, in an alternative design, the stator pegs 32 of FIG. 1 in each circumferential row may be covered with a corresponding dielectric sleeve 82, each dielectric sleeve 82 being concentric about axis 18 and having an axial length substantially equal to the length of the corresponding stator pegs 32 and having a radially measured thickness that may be varied to be larger than the diameter of the stator pegs 32 to fully cover the stator pegs 32 or may be less than the diameter of the stator pegs 32 to bridge the stator pegs 32. The thickness may be adjusted to provide the desired electrical properties. Likewise, each circumferential row of rotor pegs 26 of FIG. 1 may be encased in a corresponding dielectric sleeve 84 also concentric about axis 18 and substantially equal in axial length to the length of the corresponding stator pegs 32 and with a radial thickness substantially equal to the radial dimension of the stator pegs 37.

Figure 12A:
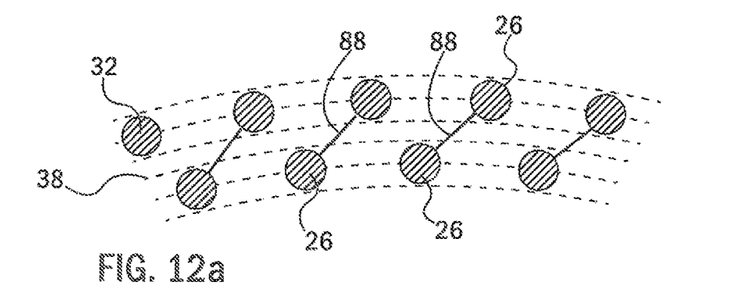
FIG. 12a is a fragmentary cross-section through overlapping pegs of the rotor and stator of FIG. 1
Figure 12B:
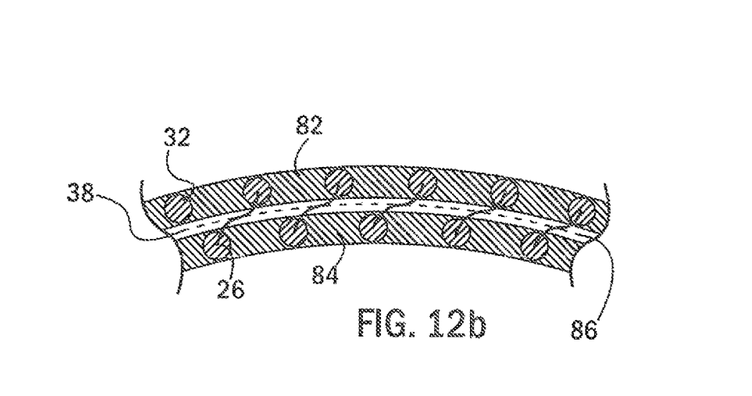
FIG. 12b is a fragmentary cross-sectional view through overlapping sleeves of the rotor and stator of FIG. 11.

As a result, and as shown in FIG. 12b, the sleeves 82 and 84 may interfit in nested fashion in the assembled electrostatic machine 10, the sleeves 82 and 84 separated by radial gaps 86, the latter of which may be filled with dielectric fluid 38. Otherwise, the construction of the electrostatic machine 10 may be substantially as described above with respect to the sleeveless design.

Referring now to FIGS. 12a and 12b, without the sleeves 82 and 84, as shown in FIG. 12a, a central flux line 88 of the electrostatic field lines between any pair of pegs 32 and pegs 26 will extend generally in a straight line between those pegs lengthening and shortening as the pegs 32 and 26 move with respect to each other on the respective stator disks 30 and rotor disk 24, The central flux line 88 will generally define the force vector between the pegs 32 and 26 and characterize the change of relative capacitance between these pegs 32 and 26 with rotation reflected in their changing separation distance, In contrast and as shown in FIG. 12b, if the sleeves 82 and 84 are constructed of a material with relatively low relative permittivity compared to the dielectric fluid 38, the central flux line 88 will curve to preferentially increase its relative path length through the dielectric fluid 38 over its path length through the materials of the sleeves 82 and 84. As noted, because the central flux line 88 practically relates to the electrical separation distance of the pegs 32 and 26, this curving of the central flux line 88 will change the functional relationship between capacitance and relative rotation of the pegs 32 and 26. Generally the change in functional relationship will provide a more triangular capacitance profile waveform similar to waveform 42' discussed above, offering the above described attendant advantages. The material of the sleeves 82 and 84 may have a value of less than three and be constructed of material such as Teflon, acetal, polyethylene or polypropylene and the dielectric fluid 38 may have a value greater than five.

It will be appreciated that the sleeves 82 and 84 displace dielectric fluid 38 to reduce the amount of dielectric fluid 38 required and, by providing a relatively constant interface between the rotor and stator and the dielectric fluid 38, to greatly reduce turbulence in the dielectric fluid 38 such as may create heating or energy loss. In addition, the sleeves 82 and 84 may provide mechanical rigidity to the pegs 26 and 32, as well as dampening to vibrational resonance. Tensile strength of the sleeves 84 helps resist the effects of centrifugal splaying in the pegs 26.

More consistent torque may be obtained by staggering, in angle about the axis 18, successive rows of pegs on either the stator or the rotor across successive rows. Similarly, pegs on different but mechanically linked rotors or stators may be staggered with respect to the corresponding pegs on other mechanically linked rotors or stators.

B. Induction Sleeves

Figure 13:
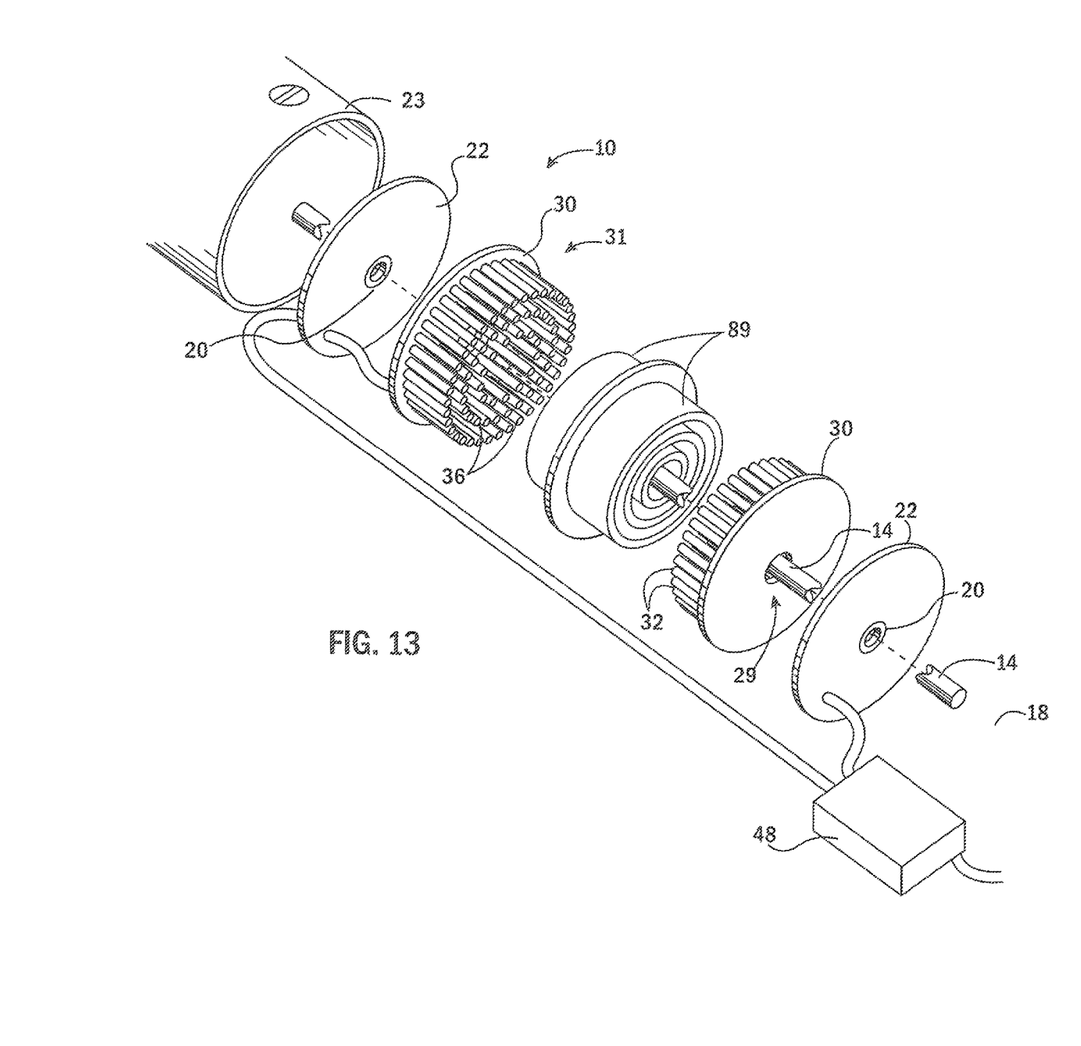
FIG. 13 is a figure similar to that of FIG. 1 showing an alternative embodiment in which rotor pegs are eliminated in favor of a dielectric rotor sleeve with high relative permittivity.

Referring now to FIGS. 1, 12 and 13, in an alternative embodiment, the rotor pegs 26 may be removed in favor of tubular rotor sleeves 89 identical in size and arrangement to tubular sleeves 84 but without included rotor pegs 26. The stator pegs 36 may be exposed as depicted or may be covered in the low permittivity sleeves 82 as shown in FIG. 11. Generally the thickness of the sleeve 82 and its material may be adjusted to optimize the leakage flux (the flux between the stator pegs that does not couple to the rotor) and the coupling flux (the flux that couples between the stator and rotor to make torque). High permittivity stator sleeve will enhance leakage (which is undesirable) but enhance torque (which is desirable) controlling this trade-off.

In contrast to the stator sleeves 82 or rotor sleeves 84 discussed above, the rotor sleeves 89 are constructed of a dielectric material having a relatively high relative permittivity with the exact material characteristics selected to maximize torque from induced charge within the rotor sleeves 89. Electrical fields established by the stator pegs 36 induce a charge moment in the rotor sleeve 89 that responds to the electrical fields of the stator pegs 36 to provide a net torque.

Figure 15:
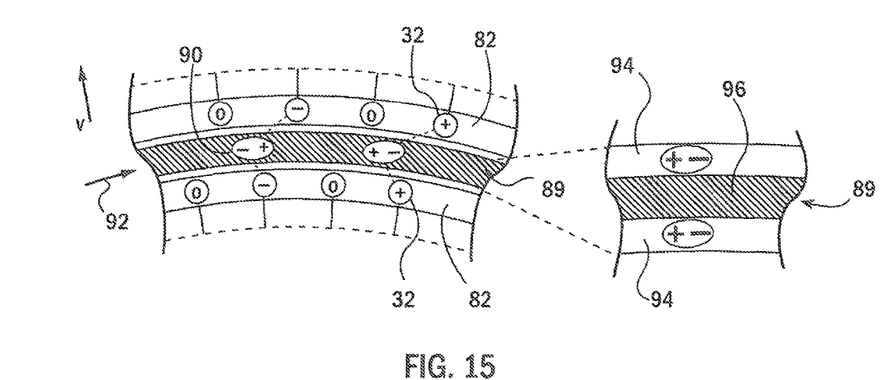
FIG. 15 is a fragmentary detailed depiction of the sleeves of FIG. 14 showing the induction of internal electrical fields within the rotor ring generating torque in, for example, three-phase operation.

Referring now also to FIG. 15, in one example, a phased set of voltages may be applied to the stator pegs 32 creating an electrical field extending into the dielectric material of the rotor sleeve 89. There, the electrical field induces electrical dipoles 90 in the material of the rotor sleeve 89. These dipoles 90 provide an electrical field interacting with the electrical field of the stator pegs 32 to attract the dipoles 90 to the stator pegs 36 causing a net torque 92 on the rotor sleeve 89. The insulating properties and permittivity of the dielectric material of the rotor sleeve 89 create a spatial persistence in the dipoles 90 that may be exploited to maximize this torque as the rotor sleeve 89 moves and the electrical field on the stator pegs 32 changes. This torque mechanism relies on the slip principle described earlier wherein a difference in the relative velocities of the stator potential wave and rotor exists.

In this embodiment, the rotor sleeve 89 may be a solid dielectric material or may have dielectric material 94 coated on the outer circumferential surfaces of the rotor sleeve 89 with the central material 96, for example, being a stronger or more readily manufactured material such as aluminum coated with barium titanate, as an example. Also the conducting rotor core enhances the electric field as the net distance between the stator pegs and a common or neutral voltage plane is reduced. The rotor core material may or may not be grounded.

Figure 14:
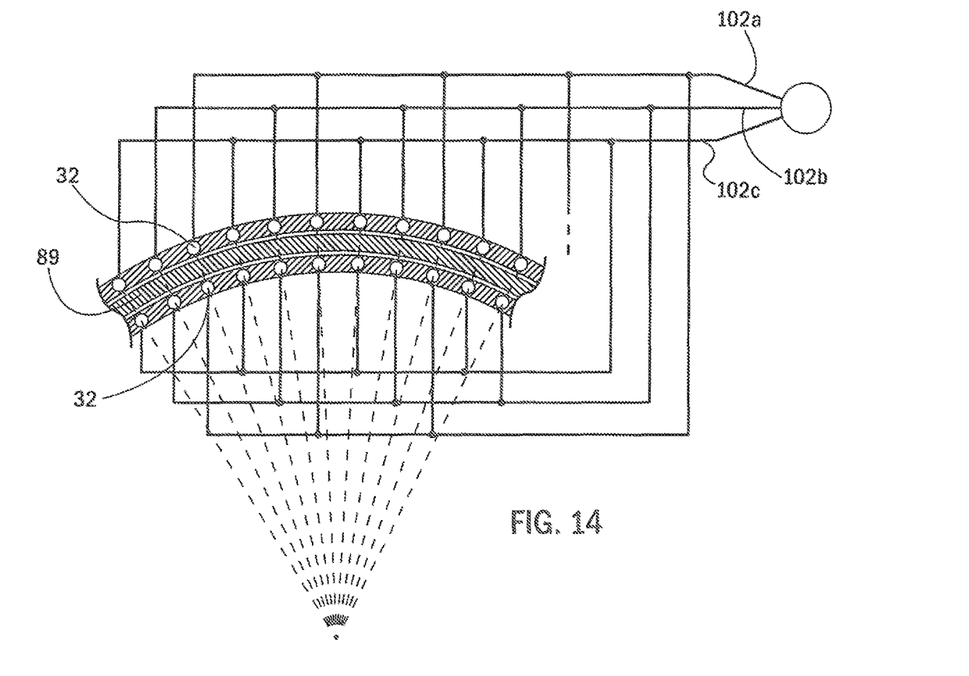
FIG. 14 is a fragmentary cross-section through an alternative embodiment similar to FIG. 11 in which the stator pegs are covered with a sleeve having a low relative permittivity and showing an overlap between the rotor sleeve and several stator sleeves as connected to three-phase power.

Referring to FIG. 14, the necessary traveling voltage waveform may be simply implemented, for example, using a multiphase power supply 100 such as a three-phase power supply whose power maybe created without the need for solid-state wave shaping circuitry but simply through mechanical electrical-generation capabilities well-known in the art. In an example, three phases 102a, 102b, and 102c may provide sinusoidal voltage waveforms of equal amplitude but each shifted with respect to the other two waveforms by 120 degrees. A different phase 102 may be connected to each successive stator peg 32 as one moves around a circumferential row of stator pegs 32 such that every third stator peg 32 is connected to a common phase 102 and no two successive stator pegs 32 are connected to the same phase 102. As noted in the discussion above, the stator pegs 32 in successive rows of stator pegs 32 may be offset in angle along lines of radius to provide more consistent torque. Generally, the stator pegs 32 in different rows may receive comparable phases 102 to create a similar traveling voltage waveform shifted in phase only by the amount of angular offset of the pegs 32. It will be appreciated that the terms rotor and stator are arbitrarily linked to a frame of stationary reference and accordingly should not be considered to be limited to elements that rotate or do not rotate. While some embodiments of the invention contemplate a dielectric liquid between the stator and rotor, more generally a dielectric fluid such as a gas may be used and in some embodiments a vacuum may replace any fluid.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will be generally understood that the electrical machines described herein may be operated either as motors or generators and in the latter case that the tailoring of the capacitive profile may be done to provide a desired output waveform.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electrostatic machine comprising:
    at least one stator element providing a plurality of axially extending conductive stator pegs; and
    at least one rotor element continuously rotatable with respect to the stator element about a rotation axis, the rotor element including an axially extending tubular sleeve of dielectric material positioned to be radially adjacent to the conductive stator pegs during rotation of the rotor;
    the electrostatic machine further including a dielectric between the conductive stator pegs and the tubular sleeve of the rotor element and wherein the tubular sleeve of dielectric material has a low relative permittivity less than that of the dielectric and encases a set of axially extending conductive rotor pegs.

2. The electrostatic machine of claim 1 wherein at least one of the stator pegs and rotor pegs include a first and second set of pegs arranged in rows of concentric circles wherein the pegs of the first set of pegs is offset angularly along different lines of radius with respect to the pegs of the second sets of pegs.

3. An electrostatic machine comprising:
at least one stator element providing a plurality of axially extending conductive stator pegs; and
at least one rotor element continuously rotatable with respect to the stator element about a rotation axis, the rotor element including an axially extending tubular sleeve of dielectric material positioned to be radially adjacent to the conductive stator pegs during rotation of the rotor
the electrostatic machine further including at least two stator elements fixed with respect to each other, each stator element providing a plurality of axially extending conductive stator pegs extending in opposite directions wherein the pegs of the at least two stator elements include a first and second set of pegs arranged in rows of equal radius concentric circles wherein the pegs of the first set of pegs are offset angularly along different lines of radius with respect to the pegs of the second sets of pegs.

4. An electrostatic machine comprising:
at least one stator element providing a plurality of axially extending conductive stator pegs; and
at least one rotor element continuously rotatable with respect to the stator element about a rotation axis, the rotor element including an axially extending tubular sleeve of dielectric material positioned to be radially adjacent to the conductive stator pegs during rotation of the rotor;
a power supply providing phased voltages on the axially extending conductive stator pegs to provide a rotating electrical field vector about the rotation axis;
the rotator element further including an electrically continuous metal electrical conductor extending circumferentially about the rotation axis and coated on at least one radially outer surface with the dielectric material, induced dipoles within the dielectric material providing torque on the rotor from the rotating electrical field vector of the stator pegs acting on the induced dipoles within the dielectric material;
wherein the dielectric provides a resistivity permitting a torque-promoting slip or difference in the rotational speeds between the rotor and rotating field vector on the stator provided by the power supply.

5. The electrostatic machine of claim 1 wherein the low permittivity is less than three.

6. The electrostatic machine of claim 5 further including a second axially extending tubular sleeve of dielectric material encasing the plurality of axially extending conductive stator pegs, the second axially extending tubular sleeve of dielectric material having a low relative permittivity less than that of the dielectric fluid.

7. The electrostatic machine of claim 6 wherein the second axially extending tubular sleeve has a relative permittivity less than five.

8. The electrostatic machine of claim 7 further including a second axially extending tubular sleeve of dielectric material encasing the plurality of axially extending conductive stator pegs.

9. The electrostatic machine of claim 7 wherein the second axially extending tubular sleeve of dielectric material has a relative permittivity of less than five.

10. The electrostatic machine of claim 7 Wherein the axially extending stator pegs receive different phases of a multiphase electrical signal to induce an electrostatic charge in the axially extending tubular sleeve generating a torque on the rotor with respect to the stator.

11. The electrostatic machine of claim 7 further including a power source providing three-phase substantially sinusoidal electrical power to the stator pegs so that every third stator peg at a given radius from the axis receives a same phase and every peg receives a different phase from its circumferential neighbors.

12. The electrostatic machine of claim 4 wherein the axially extending tubular sleeve of dielectric material has a relative permittivity greater than three.

13. The electrostatic machine of claim 12 wherein the axially extending tubular sleeve of dielectric material provides a high dielectric material coated on a supporting tube of a different material.

14. The electrostatic machine of claim 13 wherein the different material is a conductor.

15. The electrostatic machine of claim 1 wherein the dielectric material provides a relative permittivity of greater than five.

16. The electrostatic machine of claim 1 wherein the stator pegs have a substantially constant cross-sectional diameter measured in a plane perpendicular to the axis.

17. The electrostatic machine of claim 1 including multiple concentric axially extending tubular sleeves of dielectric material attached to rotate together on the rotor and flanked by multiple sets of stator pegs in concentric circles about the axis.

18. The electrostatic machine of claim 1 further including:
a housing;
an axle extending along an axis and supported on the housing for rotation about the axis wherein the axle supports at least one of the rotor and stator elements; and
electrical terminals attached to the housing for electrical communication with the conductive stator pegs.

19. The electrostatic machine of claim 18 further including an insulating high relative permittivity fluid retained within the housing to surround the tubular dielectric material and stator pegs preventing arcing.

20. The electrostatic machine of claim 1 wherein the electrically continuous electrical conductor extending circumferentially about the rotation axis is a conductive metal tubular cylinder.

* * * * *